UNITED STATES PATENT OFFICE.

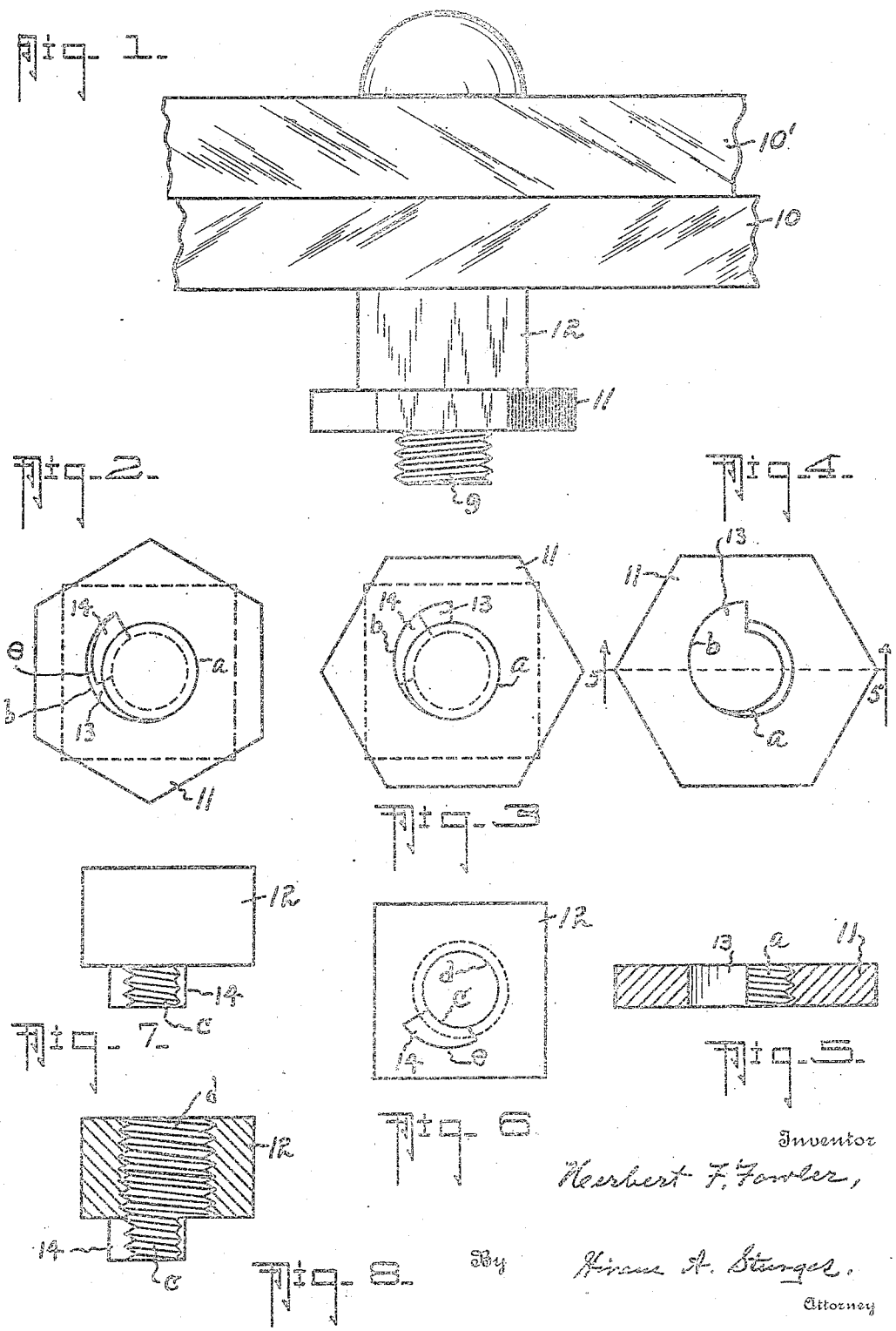

HERBERT F. FOWLER, OF OMAHA, NEBRASKA, ASSIGNOR OF ONE-HALF TO EDWARD BIGNELL, OF LINCOLN, NEBRASKA, AND ONE-FOURTH TO LE ROY J. FOWLER, OF OMAHA, NEBRASKA.

LOCK-NUT.

1,262,188. Specification of Letters Patent. Patented Apr. 9, 1918.

Application filed April 2, 1917, Serial No. 159,157. Renewed February 2, 1918. Serial No. 215,225.

*To all whom it may concern:*

Be it known that I, HERBERT F. FOWLER, a citizen of the United States, residing at Omaha, in the county of Douglas and State of Nebraska, have invented certain new and useful Improvements in Lock-Nuts, of which the following is a specification.

This invention relates to an improvement in nut-locks of the class used in connection with threaded bolts to prevent loosening of the seating of the nut on the bolt from vibration, and has for its object to provide two nuts so constructed that they will both operate in an equal degree in sustaining stresses directed longitudinally of the bolt, and also will coöperate to prevent any reverse rotation thereof, on the bolt, from vibration.

The invention includes a bolt-nut provided with a recess opening on its inner, circular, threaded wall, the wall of said recess being non-concentric with the threaded wall, said nut to be used in connection with a second bolt-nut having a segmental projection at one of its ends provided with threads on its concaved side adapted to mesh with the threads of the bolt, the convexed wall of said projection being non-concentric with its threaded wall, the thickness of the first named nut being equal to the length of the projection, so that when the parts are assembled, the first named nut will be disposed flush with the end of the projection. Other features considered of advantage and outlining the scope of the invention will be mentioned hereinafter.

In the drawing, Figure 1 is a side view of parts showing the nuts applied to a bolt. Fig. 2 is an end view of the two nuts when assembled showing the projection disposed in the large part of the segmental recess of the other nut. Fig. 3 is a view similar to that shown in Fig. 2, the lug being disposed in the convergent part of the recess of the other nut. Fig. 4 is a plan view of a nut provided with a recess. Fig. 5 is a view in transverse section on line 5—5 of Fig. 4. Fig. 6 is a plan view of a nut provided with a threaded projection. Fig. 7 is a side view of the same. Fig. 8 is a view in longitudinal section of the nut shown in Figs. 6 and 7.

The invention is illustrated in connection with a threaded bolt 9 which traverses a pair of plates or strips 10 and 10', a bolt-nut 11 and a second bolt-nut 12, for pressing the strips or plates toward each other.

The nut 11 is provided with a recess 13 which opens on its ends and also opens on a part of its aperture or circular, threaded wall $a$, said recess being of segmental form and having a smooth, concave wall $b$ which is non-concentric with the wall $a$.

The second nut 12 is provided at one of its ends with a projection 14 of segmental form in plan, said projection being provided with an inner threaded wall $c$ concentric with and disposed in the plane of the circular, threaded wall $d$ of said nut 12, said projection having an outer, smooth, convexed wall $e$ which is non-concentric with the walls $c$ and $d$.

In operation, to cause a pressure against each other of any two parts or objects, as the members 10 and 10' when the bolt is disposed in the conventional apertures of said strips, the nut 12 is disposed with its projection within the recess of the nut 11, and the two nuts are rotated in the same direction until the nut 12 engages the object, and after the nut 12 has a required firm seating, by reason of said rotation, on said object, an additional, slight, rotatable movement, in the same direction, is imparted to the nut 11, so that the convergent end of the projection 14 will be compressed within the convergent end of the recess 13 of the nut 11, and it will be appreciated that any reverse, rotatable movement of the nut 11, thereafter, will be resisted and prevented for the reason that any tendency for such a movement would only result in an increased compression of the projection in the recess, and therefore jolts or vibrations will not cause any rotation of either of the nuts since the eccentric mounting for the projection causes the threads $c$ of the projection and the threads $a$ of the nut 11 to be pressed against opposed sides of the bolt with such force that any rotatable movement is prevented.

In instances where bolts are used upon metallic bridges or the track-rails of railways, the metallic parts become worn away by action of rust, which results in a loose fitting of the bolts, and therefore occasional adjustments are required, and when bolts are used upon wooden structures, adjustments are required on account of shrinkage of the wood. The herein described nut-lock is of great advantage for use upon all metallic and wood structures for the reason that the bolts and nuts may be repeatedly used, without injury.

The important feature disclosed by the invention is the provision of threads $a$ for the nut 11, this being entirely new in the art. On account of this feature the threads of the bolt do not become injured by action of said bolt 11, the operation being that when the nut 11 is rotated for its locked relation, the threads $a$ are pressed against the threads of the bolt with such force that any reverse rotation of the nut 11 for loosening it, will be prevented. It will be noted that the threads of the nut 11 and the threads of the bolt 9 are not disposed transverse with respect to each other, and that the threads of these parts will be disposed in register during operation, and it therefore follows that, during operation, the threads of the nut 11 will not injure the threads of the bolt.

Another advantage is the fact that the threads of the nut 11 resist longitudinal movement and longitudinal stresses directed to either of the nuts 11 or 12, the same as the threads on the nut 12, which function is new in the art.

Another feature of advantage is the fact that since the nut 11 has a length or thickness corresponding to the length of the projection 14 of the inner nut 12, the outer face of said nut 11 will be disposed flush with the end of the projection.

When it is desired to remove the nuts from the bolt, the inner nut 12 is rotated in a manner to cause its compression against the object 10 to be slightly increased, which causes its projection to occupy a somewhat larger part of the segmental recess 13 of nut 11, and the nuts may then be readily removed from the bolt by rotating them in a reverse direction than first mentioned.

Having fully described my invention what I claim and desire to secure by Letters Patent is,—

1. In a lock-nut for threaded bolts, an interiorly threaded nut provided at one of its ends with a segmental projection, a second nut having a threaded aperture and provided with a recess opening on said aperture for receiving the projection of the first named nut, the outer wall of the recess of the second nut being non-concentric with the threaded wall of its aperture and the outer wall of the projection being non-concentric with the wall of its threaded aperture to cause the threaded wall of the second nut to be pressed against the threads of the bolt to prevent a revoluble movement of the second nut in one direction when the second nut has been rotated for a movement into engagement with the first named nut.

2. In combination with a threaded bolt, a nut provided with a segmental lug having an eccentric outer wall, a second nut having a recess opening on the threaded wall of its aperture for receiving the lug of the first named nut when said nuts are disposed end to end on said bolt, said recess being of segmental form and having an eccentric outer wall adapted to be engaged by the lug for pressing the threaded wall of said second nut against the threads of the bolt when said second nut is rotated in one direction.

In testimony whereof, I have affixed my signature in presence of two witnesses.

HERBERT F. FOWLER.

Witnesses:
HIRAM A. STURGES,
ARTHUR H. STURGES.